Figure 1:
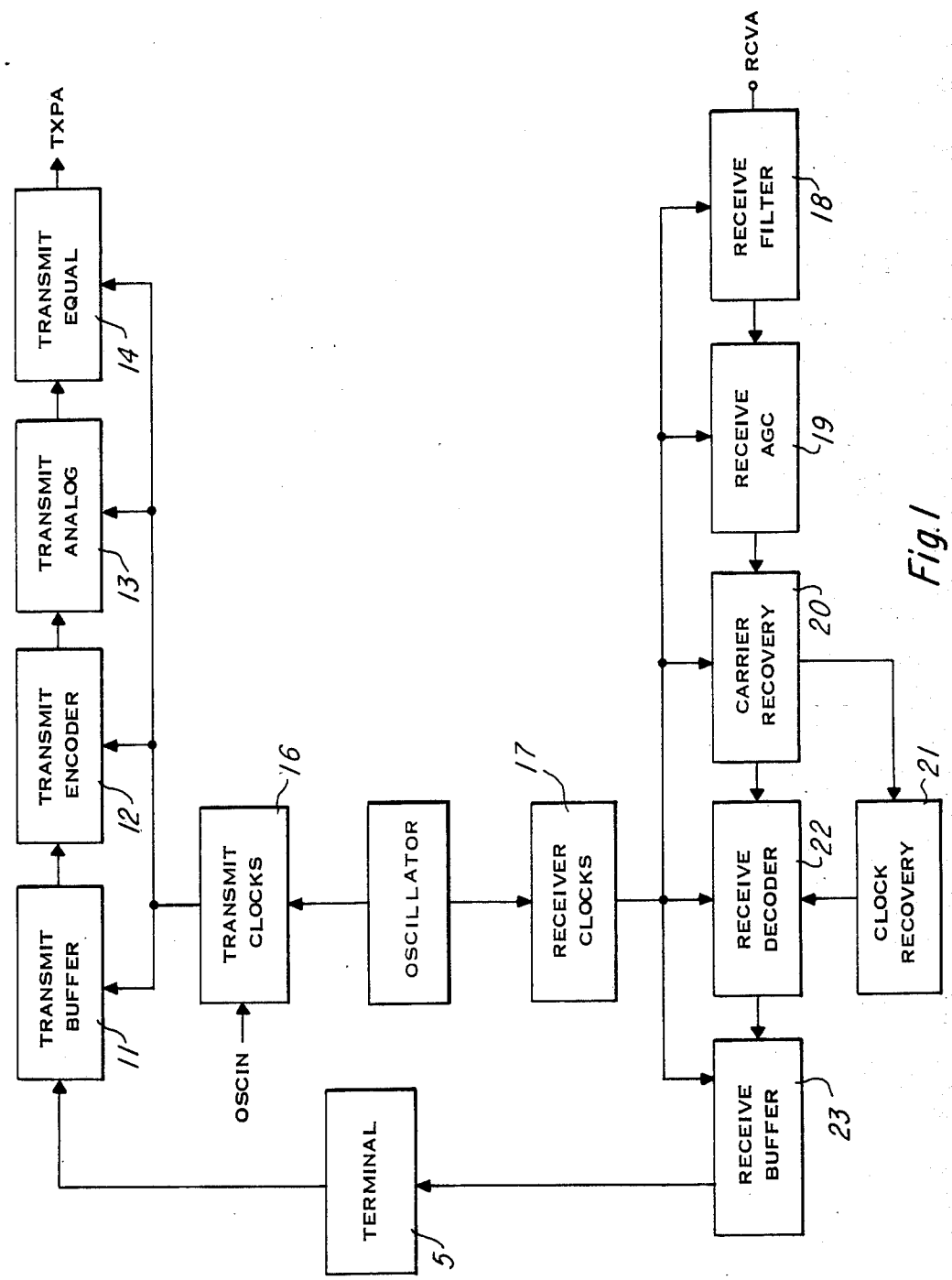

United States Patent [19]

Hochschild

[11] Patent Number: 4,559,634
[45] Date of Patent: Dec. 17, 1985

[54] PSK MODEM HAVING DUAL-INTEGRATOR VOLTAGE CONTROLLED OSCILLATOR

[75] Inventor: James R. Hochschild, Houston, Tex.
[73] Assignee: Texas Instruments Incorporated, Dallas, Tex.
[21] Appl. No.: 408,557
[22] Filed: Aug. 16, 1982
[51] Int. Cl.[4] ............................................. H04L 27/18
[52] U.S. Cl. ................................. 375/9; 331/113 R; 307/291
[58] Field of Search .......................... 375/9, 52, 55, 76; 331/177 R, 150, 144, 143, 113 R; 328/61, 66, 62; 307/291, 593

[56] References Cited

U.S. PATENT DOCUMENTS

| | | | |
|---|---|---|---|
| 3,560,864 | 2/1971 | Nihof | 331/177 |
| 3,909,635 | 9/1975 | Maida | 331/113 R |
| 3,914,712 | 10/1975 | Currie | 331/177 R |
| 4,270,206 | 5/1981 | Hughes | 375/9 |
| 4,336,613 | 6/1982 | Hewes | 375/9 |
| 4,340,871 | 7/1982 | Teza | 331/113 R |
| 4,370,628 | 1/1983 | Henderson et al. | 331/113 R |

Primary Examiner—Robert L. Griffin
Assistant Examiner—Stephen Chin
Attorney, Agent, or Firm—Thomas G. Devine; Leo N. Heiting; Melvin Sharp

[57] ABSTRACT

A PSK modem has a transmitter for converting received digital signals into corresponding PSK output signals and a receiver for receiving PSK signals and converting into corresponding digital signals. The receiver has a dual-integrator voltage controlled oscillator in which, during any given cycle of oscillations, one-half of the circuit is integrating toward the threshold voltage while the other half is idle. When the output of the integrating half reaches the threshold voltage, a control flip-flop toggles and the formerly idle integrator half begins to integrate, allowing the other half to stabilize before the next cycle of oscillation.

12 Claims, 2 Drawing Figures

PSK MODEM HAVING DUAL-INTEGRATOR VOLTAGE CONTROLLED OSCILLATOR

BACKGROUND OF THE INVENTION

1. Field of the Invention

This invention relates to phase shift keying (PSK) modems and in particular to integrated circuit PSK modems employing field effect transistors and switched capacitor filters. More specifically, this invention relates to a PSK modem voltage controlled oscillator (VCO).

2. Description of the Prior Art

Discrete component type VCO's are well known in the prior art. Also, integrated circuit VCO's are well known in the prior art. High speed VCO's require expensive, high-speed operational amplifiers.

High-speed VCO's may be digital type VCO's as employed in the prior art.

This invention uses conventional components to provide a high-speed VCO.

BRIEF SUMMARY OF THE INVENTION

An integrated circuit PSK modem has a transmitter section for converting received digital signals into corresponding PSK signals for output transmission. The modem also has a receiver for receiving PSK signals and for converting those PSK signals into corresponding digital signals. The receiver has a demodulating section which in turn includes a dual integrator voltage controlled oscillator for use in the demodulating process.

The voltage controlled oscillator has a switched capacitor input circuit for receiving an input voltage signal and first and second integrators, connected in parallel. A comparator receives the outputs of the integrated circuits, selectively. A threshold voltage is applied to the other input of the comparator. The output of the comparator clocks a flip-flop whose Q output controls a transistor switch for connecting the output of the first integrator to the input of the comparator and to another transistor switch connected to short out the second integrator when the first integrator output is connected to the input of the comparator. The Q— output of the flip-flop gates a transistor switch that connects the output of the second integrator to the input of the comparator and to a transistor switch connected to short out the first integrator when the output of the second integrator is connected to the input of the comparator.

When the integrator that is connected in the circuit integrates to the point where the threshold voltage level is reached, the output of the comparator causes the flip-flop to switch states activating the respective connecting and shorting transistor switches to place the other integrator in the circuit.

The principal object of this invention is to provide a high-speed, analog voltage controlled oscillator in a PSK modem.

Another object of this invention is to provide a PSK modem having a high-speed voltage controlled oscillator that uses inexpensive and conventional components.

These and other objects will be made evident in the detailed description that follows.

FIG. 1 is a block diagram of the bilateral digital data transmission system of this invention.

Figure 2:
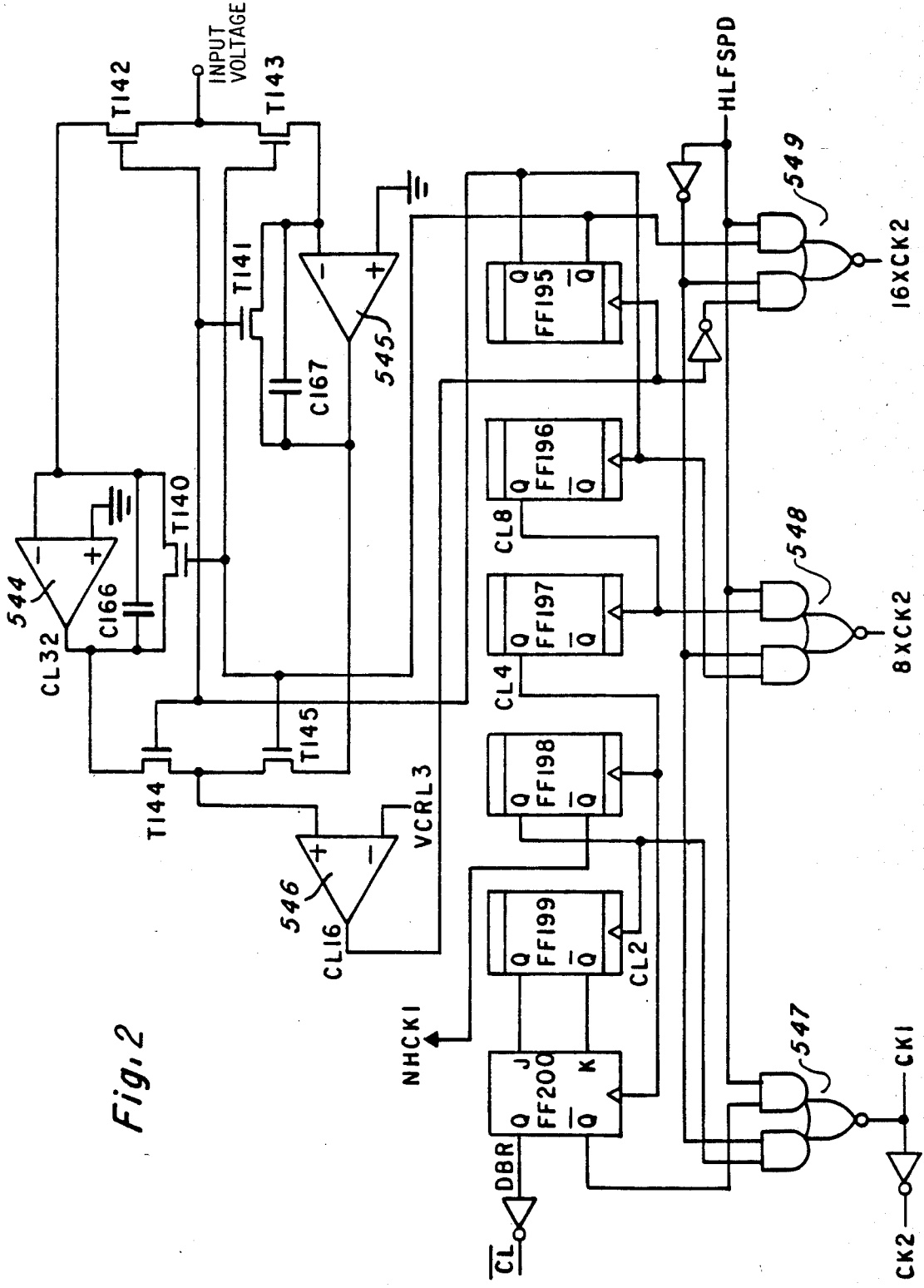

FIG. 2 schematically illustrates the dual-integrated voltage controlled oscillator of this invention.

FIG. 1 is a block diagram of the entire system. Data terminal 5 is shown as the digital data handling hardware of this invention. In this preferred embodiment, terminal 5 is a Texas Instruments Incorporated Model 787 portable communications data terminal, fully described in Texas Instruments Manual #2265938-9701, copyright 1980. The digital data handling hardware could, of course, be any digital computer, terminal, or any other hardware source for receiving and/or sending out digital data.

Terminal 5 is shown connected to transmit buffer 11 whose output is shown connected to transmit encoder 12. Transmit encoder 12 sends encoded information to transmit analog 13 which sends a PSK modulated waveform into (in this preferred embodiment) a transmit equalizer circuit (14) which provides carrier signal TXPA at a given frequency. Transmit encoder 12 and transmit analog 13 form the transmit modulator. The above circuits are clocked by transmit clocks generated from signal OSCIN.

PSK modulated waveform RCVA, a carrier signal at a frequency different from that of signal TXPA is received by receive filter 18 which is acted upon by receive AGC19 for adjusting gain of the input signal. Carrier recovery circuit 20 receives the filter signal, splits it into baseband signals and adaptively equalizes the baseband signals to remove cross-talk between the transmiter and receiver transmission lines. The baseband signals are sent to clock recovery circuit 21 which recovers the clock used in the transmission for decoding the baseband signals and receive decoder 22. Clock recovery circuit 21 includes the dual-integrated voltage controlled oscillator of this invention, used in recovering the clock signal used in the transmission from the data transmitted. The output of receive decoder 22 is shown entering receive buffer 23.

For a detailed description of the transmitter and receiver of this system, please see U.S. patent application Ser. No. 408,559 filed on Aug. 16, 1982, entitled "Bilateral Digital Data Transmission System", now U.S. Pat. No. 4,519,083, and incorporated herein by reference.

The voltage controlled oscillator (VCO) of this invention is a dual-integrator VCO in which, during any given cycle of oscillation, one half of the circuit is integrating toward the threshold voltage, while the other half is idle with its integrating capacitor fully discharged awaiting the next cycle. This is achieved through flip flop FF195, a toggle flip flop receiving its clock input from the output of comparator 546 signal CL16. The Q output of flip flop FF195 is connected to the gates of transistors T144 and T141. The Q— output of flip flop FF195 is connected to the gate of transistor 145 and transistor T140. Transistor T141 is connected across operational amplifier 545 and its feedback capacitor C167. Transistor T140 is connected across operational amplifier 544 and its feedback capacitor C166. Therefore, if flip flop FF195 is set and Q is high, then transistor T144 is turned on and transistor T141 is turned on. By turning on transistor T141, operational amplifier 545 is removed from the circuit. Therefore, the operational amplifier 544 and its associated components provide the VCO. The output of operational amplifier 544 passes through transistor T144 to the positive input of comparator 546. The negative input of comparator 546 is voltage reference VCRL3 (minus 3 volts in this preferred embodiment). The output of operational amplifier 544 ramps downward and when it reaches 25 volts, the comparator output toggles flip flop FF195 so that Q becomes high, in which case transistor T145 is gated on, as is transistor T140. When transistor T140 is gated on, operational amplifier 544 is out of the circuit. Operational amplifier 545 comes into the circuit with its output connected through transistor T145 to comparator 546. The operation repeats as indicated above.

This dual-integrator VCO provides for a very fast VCO operation which otherwise would be limited by the speed of the operational amplifier. By immediately starting the other operational amplifier ramping, the delay ordinarily encountered is eliminated and a very fast VCO results.

AND NOR gates 547, 548 and 549, as shown, provide output signals CK1 and CK2, 8XCK2— and 16XCK2, respectively. Signal HLFSPD and signal HLFSPD— are input to each of circuits 547–549. Signal CL16 from comparator 546 is inverted and applied to gate 549.

The Q output of flip flop FF195 clocks toggle flip flop FF196 which provides signal CL8 on its Q output and clocks flip flop FF197. Flip flop FF197 provides signal CL4 on its Q output and clocks flip flop FF198 and flip flop FF200. Flip flop FF198 provides signal CL2 on its Q output and clocks flip flop FF199. The Q output of flip flop FF195 provides an input to circuit 548. The Q output of flip flop FF196 provides an input to circuit 458. The Q output from flip flop FF198 and the Q— output from flip flop FF200 provide inputs to circuit 547, as shown. The Q output of flip flop FF200 is signal DBR which, inverted, is signal CL—.

Anyone skilled in the art is capable of departing from the preferred embodiment shown herein without departing from the spirit of the invention. The invention is not limited by this preferred embodiment, with obvious implementation changes possible, but is limited only by the appended claims.

What is claimed is:

1. An integrated circuit PSK modem for transmitting and receiving PSK signals derived from digital signals over first and second carrier frequencies respectively, comprising:
   (a) transmit encoding means for encoding digital data into a first format for conversion to corresponding PSK signals;
   (b) transmit modulating means, implemented in switched capacitor circuitry, and connected to receive the first format, for phase modulating the first carrier frequency according to the first format to provide corresponding PSK signals;
   (c) receive demodulating means, for demodulating the PSK signals on the second carrier frequency to provide PSK signals in a second format for conversion to corresponding digital signals, the demodulating means including a dual integrator voltage controlled oscillator comprising input means for receiving an input voltage signal, first integrator means connected to the input means, second integrator means connected to the input means, comparator means having an input connected to the outputs of the first and second integrator means, and a threshold voltage connected to its other input, and switch means, connected at the output of the comparison means and to the first and second integrator means, responsive to the output of the comparator means to switch the first integrator in and the second integrator out of the circuit when the second integrator output reaches the threshold voltage, and vice versa; and
   (d) receive decoding means connected to receive the second format for including the second format into corresponding digital signals.

2. The modem of claim 1 wherein the first and second integrator means comprise operational amplifiers.

3. The modem of claim 2 wherein the switch means comprises a flip-flop, clocked by the output of the comparator means.

4. The modem of claim 3 further comprising first and second switches controlled by one output of the flip-flop, the first switch selectively connecting the output of the first integrating means to the input of the comparator means and the second switch selectively shorting the second integrator from the circuit.

5. The modem of claim 4 further comprising third and fourth switches controlled by another, negated output of the flip-flop, the third switch selectively connecting the output of the second integrating means to the input of the comparator means, and the fourth switch selectively shorting the first integrator from the circuit.

6. The modem of claim 5 wherein the first, second, third and fourth switches comprise FET transistors.

7. A dual-integrator voltage controlled, switched capacitor oscillator comprising:
   (a) input means for receiving an input voltage signal;
   (b) first integrator means connected to the input means;
   (c) second integrator means connected to the input means;
   (d) comparator means having an input connected to the outputs of the first and second integrator means and a threshold voltage connected to its other input; and
   (e) switch means, connected at the output of the comparison means and to the first and second integrator means, responsive to the output of the comparator means to switch the first integrator in and the second integrator out of the circuit when the second integrator output reaches the threshold voltage, and vice versa.

8. The voltage controlled oscillator of claim 7 wherein the first and second integrator means comprise operational amplifiers.

9. The voltage controlled oscillator of claim 8, wherein the switch means comprises a flip-flop clocked by the output of the comparator means.

10. The voltage controlled oscillator of claim 9, further comprising first and second switches controlled by one output of the flip-flop, the first switch selectively connecting the output of the first integrator means to the input of the comparator means, and the second switch selectively shorting the second integrator from the circuit.

11. The voltage controlled oscillator of claim 10, further comprising third and fourth switches controlled by another, negated output of the flip-flop, the third switch selectively connecting the output of the second integrating means to the input of the comparator means, and the fourth switch selectively shorting the first integrator from the circuit.

12. The voltage controlled oscillator of claim 11 wherein the first, second, third and fourth switches comprise FET transistors.

* * * * *